United States Patent [19]

Hetzler

[11] Patent Number: 5,210,660
[45] Date of Patent: May 11, 1993

[54] SECTORED SERVO INDEPENDENT OF DATA ARCHITECTURE

[75] Inventor: Steven R. Hetzler, Sunnyvale, Calif.

[73] Assignee: International Business Machines Corporation, Armonk, N.Y.

[21] Appl. No.: 466,194

[22] Filed: Jan. 17, 1990

[51] Int. Cl.$^5$ ............................................. G11B 5/012
[52] U.S. Cl. .................................. 360/51; 360/77.08; 360/48; 369/47
[58] Field of Search ....................... 369/47, 48, 49, 58, 369/32, 44.34, 44.25, 44.26, 109, 111, 275.1, 275.2, 275.3, 275.4, 124; 360/77.08, 77.11, 77.06, 77.02, 135, 40, 53, 48, 47, 51, 72.2

[56] References Cited

U.S. PATENT DOCUMENTS

| | | | |
|---|---|---|---|
| 4,016,603 | 4/1977 | Ottesen | 360/72.2 |
| 4,135,217 | 1/1979 | Jacques et al. | 360/77 |
| 4,630,140 | 12/1986 | Sugimura et al. | 360/47 |
| 4,823,212 | 4/1989 | Knowles et al. | 360/77.08 |
| 4,841,498 | 6/1989 | Sugimura et al. | 360/53 |
| 4,933,786 | 6/1990 | Wilson | 360/78.14 |

FOREIGN PATENT DOCUMENTS 0278006  7/1987  European Pat. Off. .
1-19567(A) 1/1989 Japan ................................ 360/77.08

OTHER PUBLICATIONS

"Servo Zones Embedded In Data Tracks Solve Old, But Create New Problems." Brett Smith, Spring 1988, pp. 45, 46 and 48.

Primary Examiner—Aristotelis Psitos
Assistant Examiner—Muhammad Edun
Attorney, Agent, or Firm—Henry E. Otto, Jr.; Thomas R. Berthold

[57] ABSTRACT

A data recording apparatus, such as a disk drive or tape drive is described wherein servo sectors written on a disk (or servo sections written on a tape) are equally spaced on a given track and read during seek, settle and track following operations. An algorithm is used to determine the allowable time separation between servo sectors (or sections) on a track and lengths of associated data sections, such as data sectors or variable length records, that may be accommodated on the disk or tape in such manner that each of the servo sectors (or sections) equally spaced on a given track is located within a data field of a data sector or within an identification region or immediately after an address indicating mark (such as address mark or index mark). The rate at which the servo sector (or section) is sampled is constant and independent of the number and lengths of the data sections. As a result of this independent relationship, this technique is suitable for CLD recording, to banded disks using sectored servo as in conventional FBA, and also even to non-sectored architectures, such as count-key-data (CKD), wherein the data is written in records of variable length, and to tape drives formatted in FBA or CKD.

14 Claims, 3 Drawing Sheets

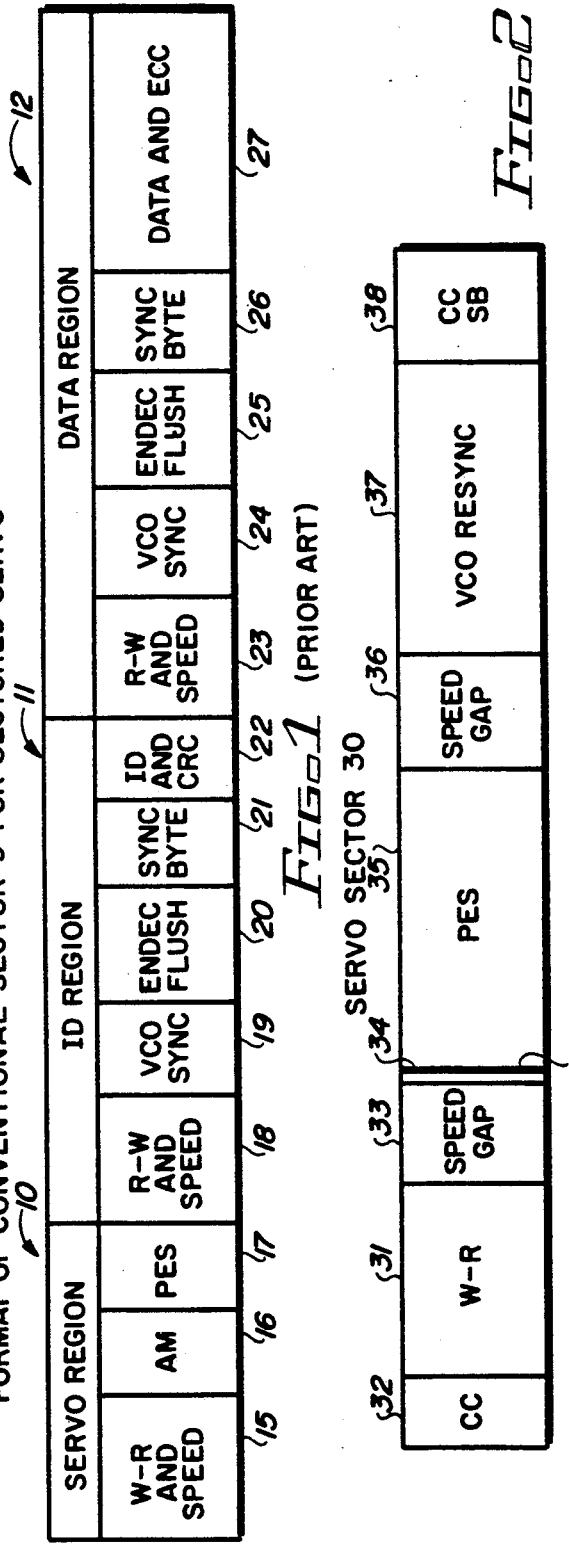
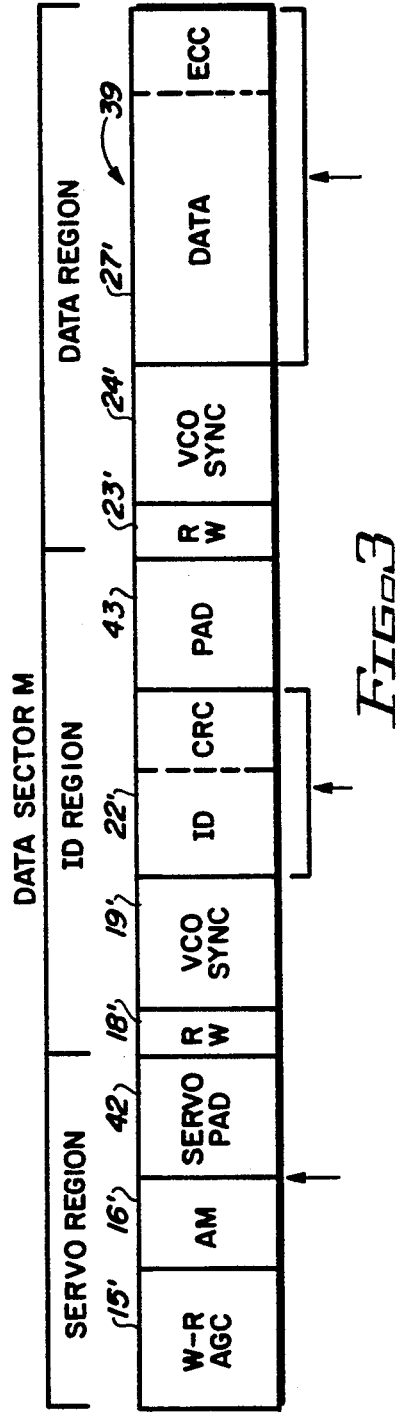

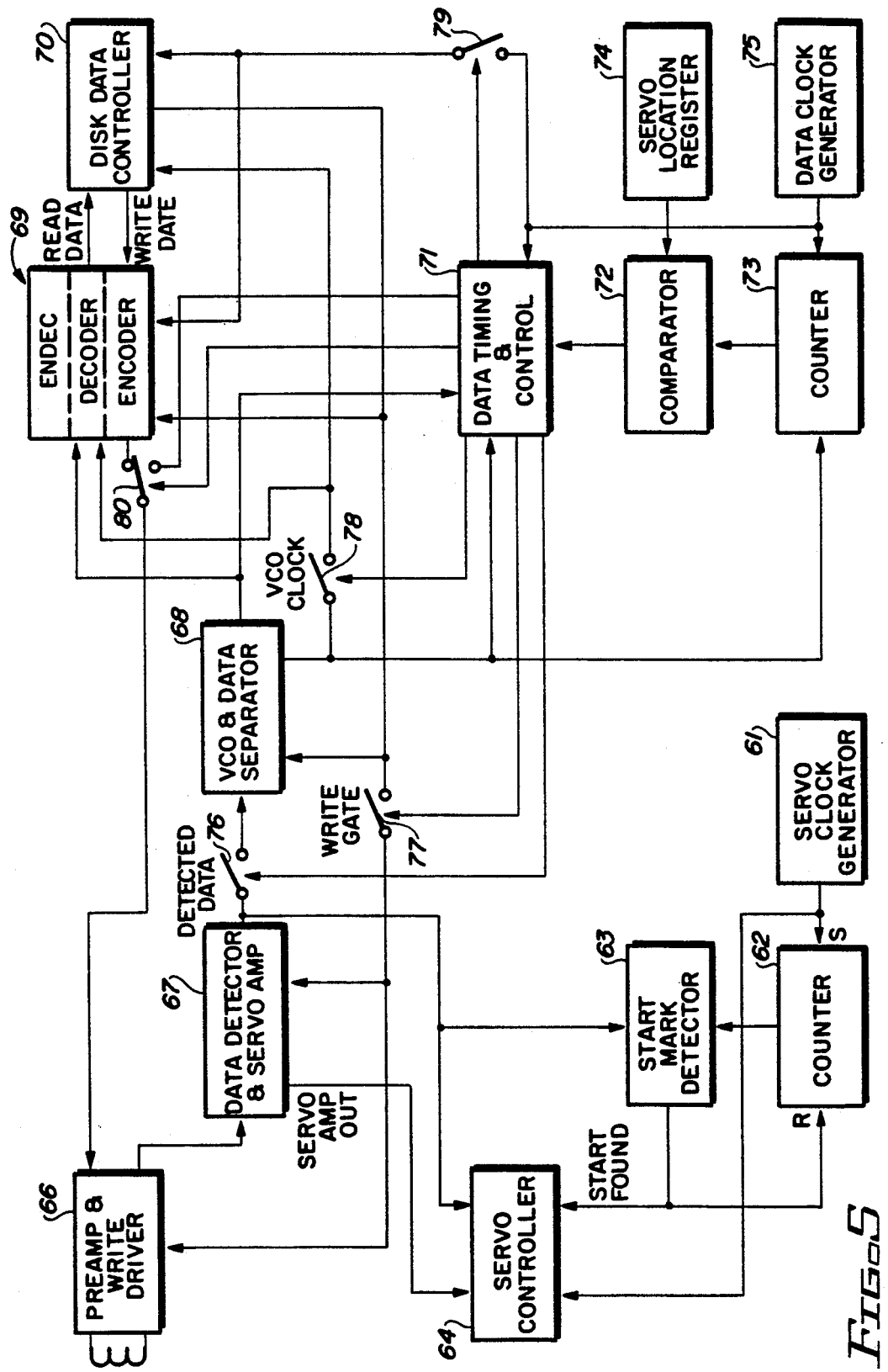

SECTORED SERVO INDEPENDENT OF DATA ARCHITECTURE

CROSS-REFERENCE TO RELATED APPLICATION

The present invention is related to application U.S. Ser. No. 07/466,195 entitled "Disk File or Tape Drive With High Servo Sample Rate", filed concurrently herewith and assigned to the assignee of the present invention.

FIELD OF THE INVENTION

This invention relates to methods and means for providing and sampling servo sections on a movable recording medium, and more particularly relates to such a method and means wherein the rate at which the servo sectors are sampled on a disk file or servo sections are sampled on a tape drive is independent of the data architecture used.

BACKGROUND OF THE INVENTION

The above-referenced related application discloses a method and means for increasing the servo sector sampling rate in a disk formatted in a fixed block architecture (FBA), such increase being effected with a minimal increase in the overhead (non-data) regions. The disk has the prior art conventional servo sectors which contain all servo and associated overhead information. However, micro servo sectors are inserted in the data fields between the conventional servo sectors to provide short bursts of servo information. These micro servo sectors contain a small portion of the overhead information, only sufficient to provide position information and to control the temporary interruption and restoration of the write current and the data stream and clock input to a data encoder/decoder. Because the servo bursts are short, no resynchronization of the VCO is necessary after each burst. These micro sector bursts are used only during settling (since they contain only position error signal data) and also preferably during seek (if an abbreviated Gray code is used); and the conventional sector servo bursts are used during read and write track following. This technique desirably provides high sample rates with minimal overhead in disk files using a sectored servo system, such as used in low end disk files with FBA format.

Several techniques, now becoming increasingly popular to increase the areal density in sectored disk files, are constant linear density (CLD) recording and banded recording. In CLD recording, the data rate for a given track depends upon its radius. Banded recording is somewhat similar, except that the data rate is constant within a given band of radii, but varies from band to band to minimize the range of linear densities. It follows, then, that if implemented in sectored servo, the number of sectors and hence of servo samples would increase progressively from the innermost to the outermost bands, and thus require the servo system to adjust to the differing sample rates. Also, seeks across bands and settles at band edges would require constant updating of the sample rate, and timing of the servo samples would vary.

There is a need for a recording technique, transparent to the user, useful for both non-sectored and sectored disk and tape formats, wherein servo sample rate is constant and is independent of the data architecture used and limited only by the total area of the disk devoted to servo information.

SUMMARY OF THE INVENTION

Toward this end, and according to the invention, a method and means is described wherein servo sectors written on a disk (or servo sections written on a tape) are equally spaced on a given track and read during seek, settle and track following operations. An algorithm is used to determine the allowable time separation between servo sectors (or sections) on a track and lengths of associated data sections, such as data sectors or variable length records, that may be accommodated on the disk or tape in such manner that each of the servo sectors (or sections) equally spaced on a given track is located within a data field of a data sector or within an identification region or immediately after an address indicating mark (such as address mark or index mark). The rate at which the servo sector (or section) is sampled is constant and independent of the number and lengths of the data sections. As a result of this independent relationship, this technique is suitable for CLD recording, to banded disks using sectored servo as in conventional FBA, and also even to non-sectored architectures, such as count-key-data (CKD), wherein the data is written in records of variable length, and to tape drives formatted in FBA or CKD.

BRIEF DESCRIPTION OF THE DRAWINGS

FIG. 1 is a diagram, not to scale, showing the regions and fields of a typical prior art data sector for a track on a disk file formatted for conventional sectored FBA;

FIG. 2 is a diagram, also not to scale, of a servo sector according to the invention;

FIG. 3 is a diagram, also not to scale, of a data sector into which at selectable locations the servo sector may be inserted;

FIG. 5 is a block diagram showing the circuitry for implementing the invention.

DESCRIPTION OF PREFERRED EMBODIMENTS

Figure 4:
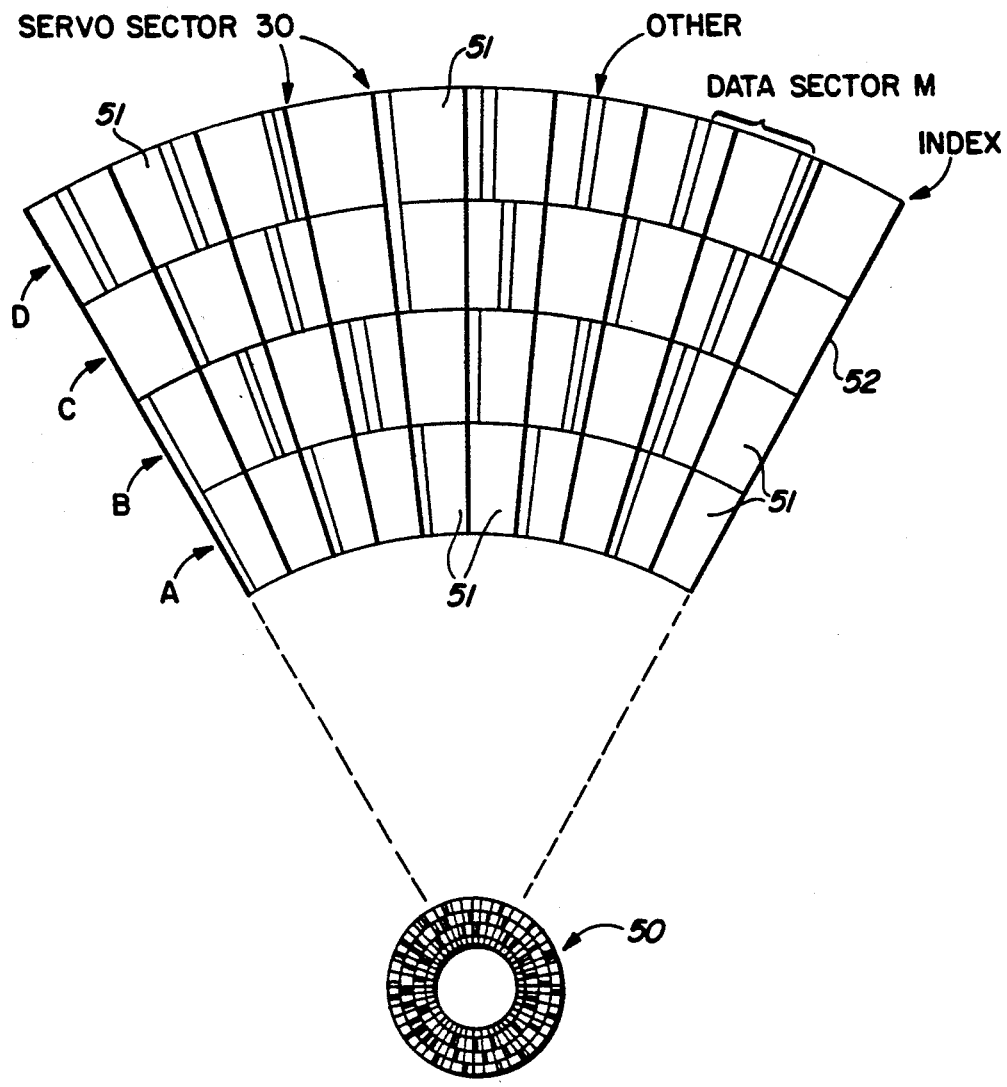
FIG. 4 is a diagram of a portion of a disk formatted in banded FBA depicting the constant sampling rate for all bands, the varied numbers of data sectors per band, and the servo sector locations in the respective bands.

I. Introduction—Description of Prior Art Servo Sector

As illustrated in FIG. 1, a typical prior art data sector 9 for a track on a FBA-formatted disk comprises a servo region 10, an identification (ID) region 11, and a data region 12. Write-read and speed field 15 allows time for the drive electronics to switch from write to read. Address mark (AM) field 16 is an asynchronous, absolute timing reference that identifies the beginning of the servo sector and provides the basis for locating the other fields. Position error signal (PES) field 17 contains the information needed to determine the track position of the recording head.

In ID region 11, read-write and speed field 18 allows the time needed to insure that PES field 17 is not overwritten and that sufficient time is provided for the write current to rise to its full value. VCO synchronization (VCO sync) field 19 is required to give the variable frequency read clock sufficient time to phase lock to the upcoming ID and CRC field 22. Encoder/decoder (ENDEC) flush field 20 indicates the number of bits the read channel decoder must receive in order to put it into a known state called ENDEC flush. Sync byte 21 indicates the sync byte needed to align the read bytes on current byte boundaries. ID and CRC field 22 includes as the ID portion a sector identifier and bad sector flag and as the CRC portion a cyclic redundancy check for errors in the reading of the ID.

In data region 12, fields 23-26 correspond to the ID fields 18-21, respectively. However, the function of sync byte field 26 is to tell the controller when the VCO synchronization and ENDEC flush end and the real data, which is contained in field 27, begins. Data and ECC field 27 stores the user data together with the error correction code. Each data region in a conventional sector servo system is completely independent of data regions in the other data sectors.

For a more detailed description of the regions 10-12 and fields 15-27, the reader is referred to the referenced related application.

II. Description of the Invention

Sector Servo System for Banded Recording on Disk

As illustrated in FIG. 2, servo sector 30, in accordance with the invention, differs significantly from the conventional sector 9. Sector 30 comprises a read-write field 31 having a code constraint (CC) portion 32 and a speed gap 33 which together provide the write-recovery function of field 15 of FIG. 1. The code constraint 32 consists of bits to prevent the decaying write current from writing a transition too close to the last data transition. Gap 33, which is to account for timing slop caused by variations in spindle speed of the disk drive motor, is inserted between field 31 and a servo start mark 34.

Mark 34 is at the leading end of the position error signal (PES) field 35 and marks the start of servo sampling. Between the end of PES field 35 and an optional VCO sync field 37 is a gap 36, again to account for variations in spindle speed. Following field 37 (or gap 36 if 37 is not used) is a field 38 containing a coding constraint and sync bits which, for example, for a (2,7) code would be 00. Each of the fields 32,37,38 are completely written during a write operation; fields 31 and 36 are partially written during a write operation; and fields 33 and 35 are written only during a servo write operation.

It will thus be seen that each servo sector 30 consists solely of bits in PES field 35 containing position information and to each side thereof bits in fields for controlling the interruption and restoration of the writing and reading of data.

FIG. 3 illustrates the various regions or fields on a typical track 39 of a data sector M that may be used to implement the invention. The servo sector 30 is not included because, in accordance with the invention, it may be inserted anywhere within any of the locations indicated by the vertical arrows in FIG. 3.

As illustrated, each track 39 preferably contains the following fields: write-read recovery and AGC field 15'; pad fields 42,43, which compensate for timing slop; and fields 16', 18', 19', 22', 23', 24' and 27' which, with 15', are essentially similar to the corresponding unprimed fields in conventional sector servo 9 of FIG. 1.

Servo sectors 30 are written at the factory and are inserted either anywhere within the data field 27' or at certain other prescribed positions in each data sector M, such as the ID/CRC field 22' or ECC portion of field 27'. However, fields 22' and said ECC portion of field 27' are so small compared with the length of the data portion of field 27' that only a small gain in number of permissible sample positions would be achieved. As a practical matter, therefore, the servo sectors 30 preferably should be inserted anywhere in the data portion of field 27' or else immediately following AM 16'.

The servo sectors 30 should not be inserted in the sync fields 19' or 24' because the VCO is then attempting a phase or frequency lock, resulting in an unpredictable drift over a servo sample. Nor should servo sectors 30 be inserted in fields 15', 18' or 23' which are required for channel recovery or in pad fields 42,43 used to accommodate timing slop.

It will be apparent that, if the servo samples occur at the AM 16', then CC field 32, W-R field 31 and gap field 33 are not required; and since pad field 42 would then follow the servo sample, VCO field 37 and CCSB field 38 are not required either. Although eliminating these fields by starting the servo samples at AM 16' desirably lowers the overhead, it probably is not sufficient enough to offset the advantage of having all the servo sectors be of identical length. In banded recording, especially, all servo sectors should be identical so that the servo system will operate independently of the banding.

FIG. 4 depicts a disk 50 formatted in FBA as banded sectors. According to an important feature of the invention, servo sectors 30 in each respective band A-D are written at equally circumferentially spaced intervals and are sampled (i.e., read) during seek, settle and track following operations. An allowable number of servo sectors per revolution and the lengths of associated data regions 51 on disk 50 is calculated such that each of the equally spaced servo sectors 30 on a given track is located anywhere within either a data field 27' of a data region 51 or an identification region 22' or immediately after an index mark 52 or address mark 16' in a data sector M. As shown in FIGS. 3 and 4, each data sector M extends from the leading end of each "other" fields (which are the overhead fields) to the end of the adjacent data region 51.

According to an important feature of the invention, it is not necessary for each servo sector 30 to start at the AM 16' or index mark 52 for every data sector M or that the positions of the servo sectors be the same for every data sector. However, formatting will be simplified, if as illustrated in FIG. 4, the first servo sector in each band starts at the common radial index 52 and each succeeding servo sector in such band is initiated at successive locations in equally spaced time increments from said index. Thus, in disk 50 the data in each concentric band A-D is clocked at the same data rate but the data rates and number of data sectors M vary from band to band.

Not all combinations of servo sample rates and numbers of data sectors M per band are permissible. Permissible combinations are those where the ratio between the number of servo samples N per revolution and the number of data sectors M in a particular band A, B, C or D reduces to a ratio of small integers. For example, assume there are 60 servo samples N per revolution; that bands A, B, C and D have 30, 36, 40 and 50 data sectors M per band, respectively; and that all servo samples are initiated at index 52. As noted in FIG. 4, the ratios of servo samples N to data sectors M in each band are 2:1, 5:3, 3:2 and 6:5 starting from innermost band A. Note that in each case the servo samples line up either at the AM position 16' or within the data regions 51 for all sectors in all bands.

Relatively prime ratios of servo samples N to data sectors M, such as 60/31, are not desirable since they are likely to violate the placement constraints. The AM 16' position tends to fall near the middle of the gap between data fields 27'; hence, the number of allowed combinations would be quite high. If the track does not have VCO or AGC sync fields, there are few servo placement restrictions because only the AM and gap fields need be avoided; and in such case nearly any ratio of servo sample N to data sectors M should be permissible, except the larger integer in either the numerator or denominator of said ratio preferably does not exceed twice the reciprocal of those portions of each track not devoted to data fields or identification fields of the data sectors.

The manner in which permissible combinations of servo samples and data sectors is computed is described in the Appendix attached hereto.

III. Implementation of the Invention

The servo system is initialized by locating a servo sector 30 at index mark 52 (FIG. 4). As illustrated in FIG. 5, clock generator 61 generates servo clock cycles which are counted by counter 62. When counter 62 reaches a preset terminal count corresponding to the number of servo clock cycles between each servo sector 30, it sends an enable signal to a start mark detector 63. Detector 63 then looks for the start mark 34 of a servo sector 30. When start mark 34 is located, detector 63 generates a start found signal, which is sent to a servo controller 64 and to counter 62. Counter 62 is reset by the start found signal and resumes counting. Servo controller 64 then reads the PES field 35 and other servo information, such as a track ID Gray code, based upon the known timing offsets from start mark 34. Servo controller 64 then operates in the same manner as a typical prior art servo controller using the PES to control an actuator (not shown).

In the preceding description, it has been assumed that spindle speed control of the disk drive motor is sufficiently precise to permit completely open-loop operation; i.e., the open-loop counting cycle is repeated for each servo sector 30 and all the servo samples line up at common index 52 at the end of each revolution of the disk. If speed control timing slop is unacceptable, however, it can be reduced by placing a sync bit into PES field 35 to reset a sample timer and thereby update the timer at every sample time.

Data for read and write operations is processed in the same manner as in the prior art, with switches 76-79 closed and switch 80 positioned as shown, until a servo sector 30 is encountered. Servo sector locations are known and stored in a servo location register 74. Prior knowledge of these servo locations allows data timing and control circuitry 71 to make the servo sector transparent to the data channel. Circuitry 71 allows the data channel to operate in the usual manner until it receives a servo location signal from a comparator 72. Comparator 72 generates this signal when the value presented by a counter 73 matches the value present at the output of a servo location register 74. Register 74 contains all the servo sector locations for the various sets of data sectors.

Counter 73 counts VCO clock cycles from a VCO and data separator 68 during read mode, and counts generated data clock cycles from a data clock generator 75 during write mode. This insures that the data timing and control circuitry 71 will interrupt the data stream at the proper bit boundary.

In response to the servo location signal from comparator 72, data timing and control circuitry 71 opens switches 78 and 79. This interrupts the VCO cycles and generated data clock cycles to disk data controller 70 and to ENDEC 69. This freezes the states of the disk data controller 70 and ENDEC 69, making each servo sector 30 transparent to the data channel.

Switch 77 is used only during write mode to put a preamp and write driver 66 in read mode to read a servo sector 30. Switch 76 is opened to prevent detected data from affecting the VCO 68. This has the effect of a VCO hold. Data timing and control circuitry 71 maintains switches 76-80 as positioned in FIG. 5 for a fixed time period until field 37. Switch 80 is used only during write mode to write VCO resync field 37 and code constraint field 38.

In write mode, switch 77 is closed first to enable writing of the VCO resync field 37. After field 37 is written, switch 80 is closed. In read mode, switch 76 is closed first to allow VCO 68 to resynchronize to the data. Switches 78 and 79 are closed when the VCO resync field operation is completed; i.e., is either written or read. The value in servo location register 74 is then updated with the location of the next servo sector 30. The channel again functions in the same manner as a prior art data channel until the next servo location signal is generated by comparator 72.

According to an important feature of the invention, the data and servo sectors work in concert such that the data channel is prepared for each servo sector 30 without requiring an address mark for that sector. To locate each servo sector only a servo start mark 34, which may be as short as 1 bit, is required. Each servo sector 30 can be located by open-loop timing from the previous servo sector and without any knowledge of the lengths or positions of the data sectors.

IV. Application to Constant Linear Density (CLD) Recording

It will be understood that the sector servo system for CLD recording is essentially the same as described for banded recording, except that the clock frequency changes at each track and the length of each data sector will change from track to track. The manner in which the permissible combinations of servo sample rates and number of data sectors per track is computed is by an apparent modification of the algorithm described in the Appendix for banded recording.

V. Application to Conventional FBA Format

A plurality of servo sectors are positioned and written at the factory. They are circumferentially spaced from each other on each track by an equal angle, which corresponds to a constant time separation. Since the data timing does not change in the FBA format, the allowed combinations of number of servo sectors and number of data sectors per track may be computed in the same manner as described in the Appendix for calculation of the allowed bands for banded recording.

Another approach is to choose a basic data unit that is of the same length as the length of the overhead fields. The allowed data record lengths would then be integral multiples of the data unit length. If the servo sector spacing is chosen such that the distance between adjacent servo sectors is equal to an integral multiple of the data unit length, then the servo sectors will never lie in disallowed regions.

VI. Application to CKD Format

Again, servo sectors are positioned and written at the factory. The first data record on a given track is placed to start at an index mark, like 52. If the next servo sector lies within the write-read recovery area, pad bits are added to the end of the record to insure that the next servo sector lies in the data region. If the next servo sector lies within a disallowed field at the start of the next data record, then pad bits are added to the end of the current record to align the next address mark with the next servo sector. This process is repeated for all sectors on the track. The controller generates the pad bits during a write operation and extracts the pad bits during a read operation, thus making said operations transparent to the host.

VII. Application to Tape Drives

While the invention has been illustrated as applied to disk drives, it will be apparent that the invention is equally applicable to tape drives. In both, the rate at which servo sectors for disk or servo sections for tape are sampled is independent of whether the disk or tape is formatted in FBA or CKD architecture.

In a tape drive, the allowable time separation between servo sections on a track and lengths of associated data sections on the tape is established such that at least some of the equally spaced servo sections on a given track are located within a data field of a data section and the rate at which the servo sections are sampled is independent of the data architecture used. Like the disk embodiments, the reading of a servo section is initiated based upon open-loop timing from the preceding servo section. The first servo section on each track commences at one common track index and each succeeding servo section is initiated at successive locations in equally spaced time increments from said index. Each servo section consists solely of bits containing position information and to each side thereof bits for controlling the interruption and restoration of the writing and reading of data. The ratio of servo sections to data sections is other than 1:1. At least some servo sections are located anywhere within a data field in a data section. At least some others of the equally spaced servo sections are within an identification field or immediately after an address indicating mark.

For a FBA formatted tape, the ratio of the time separation between data sections to the time separation between servo sections should again reduce to a ratio of small integers. For a CKD formatted tape, it will be necessary to add pad bits as described in Section VI.

As hereinafter used in the claims, the term "moving medium" is intended, unless otherwise indicated, to generically define either a magnetic, magneto-optical or optical disk or a magnetic or optical tape; the term "servo sections" is intended generically to cover servo sectors for disk files and servo sections for tape drives; and the term "data sections" is intended to generically define the data sectors for FBA and CLD formats and the variable length records for CKD format.

In the disk embodiments, the allowable number of servo sectors per revolution was calculated for each track or band of tracks. It will be apparent, however, that in view of the constant rotational speed of the disk, the time between each servo sector is constant. Hence, in both the disk and tape embodiments, the allowable time separation between servo sectors on a track is calculated, though in the disk embodiment this was expressed as allowable number of servo sectors on a track.

While the invention has been shown and described with respect to preferred embodiments thereof, it will be understood by those skilled in the art that changes in form and detail may be made in these embodiments without departing from the scope and teaching of the invention. Accordingly, the method and means herein disclosed are to be considered merely as illustrative, and the invention is to be limited only as specified in the claims.

APPENDIX

Computation of Permissible Servo Sample to Data Sector Combinations for Banded Recording in FBA Format Assuming initially that the allowable linear density as a function of radius is known, the various fields are broken down into those portions which scale with linear density and those which do not. All references to bits are in message (non-encoded) bits; and the linear density units are kbpmm (kilobits per millimeter), also message bits. Assume further that DB = number of data bits per sector (same for all bands for banded recording)

SB = number of servo bits (data rate dependent portion)

SF = fixed length portion of servo in $\mu s$

OB = number of bits in other fields (data rate dependent portion)

OF = fixed length portion of other fields in $\mu s$

P = rotational period in $\mu s$ (i.e., 1/rpm)

M = number of data sectors in a band

N = number of servo samples per revolution ld(r) = linear density in kbpmm, where r is the radius in mm OH = fixed overhead The minimum allowable ID radius for a band is then given by:

$$\text{bits} = \frac{(M \times (DB + OB) + N \times SB)}{1000}$$

$$OH = M \times OF + N \times SF$$

$$r = \frac{\text{bits}/ld(r)}{2\pi \left(1 - \frac{OH}{P}\right)}$$

$$rld(r) = \frac{\text{bits}}{2\pi \left(1 - \frac{OH}{P}\right)}$$

Where ld(r) is a constant,
$ld(r) = B$, $$r = \frac{\text{bits}}{2B\pi \left(1 - \frac{OH}{P}\right)}$$

and where ld(r) is linear:
$ld(r) = Ar + B$, $$r = \frac{-B + \sqrt{B^2 + \dfrac{4A\text{bits}}{2B\pi\left(1 - \dfrac{OH}{P}\right)}}}{2A}$$

Usually the linear density decreases with increased radius, therefore A<0 and B>0. In this case, the positive root of the quadratic yields the smaller radius (the negative root occurs where the decreasing linear density is compensated for by the increasing circumference of the track).

Once the minimum allowable ID radius has been computed, the actual relationship between the positions of servo sectors 30 and data sectors M must be computed to determine if the band is valid; i.e., that the servo samples N occur only in the allowed positions.

To determine the allowed bands:

1. Choose a servo sample rate. (For example, 60.)
2. Compute the band with the greatest number of data sectors, whose minimum allowable ID radius is less than or equal to the disk ID. (For example, assume the result is 31 data sectors.)
3. Starting with this band, check to see if it is valid. If not, decrease the sector count by 1 and repeat. (Thus, decrease from 31 to 30.) Note that if the sector count goes to 0 without success, there is no allowable ID band under these conditions.
4. Start with the first band whose minimum allowable ID radius is greater than the disk ID. (This could be 30 data sectors as a result of the example used for step 3.)
5. See if the band is valid, if so, add it to the list. Increase the sector count by 1 and repeat until the minimum allowable ID radius is greater than or equal to the disk OD. (Again, using the example from the prior steps, step 5 could give the following numbers of data sectors per band: 30, 35, 36, 40, 42, 45, 48, 50 and 54, of which for simplified illustration only four, A-D, are shown in FIG. 4.)

We claim:

1. A fixed block architecture disk drive comprising:
   a rotatable, rigid magnetic recording disk having a plurality of concentric tracks divided into angular sectors of fixed blocks, each block containing a data field for the recording of magnetically written data, and a plurality of generally equally angularly spaced servo sectors containing servo position information extending in a generally radially straight line across the tracks, at least some of the servo sectors being located within the data fields and splitting the data fields into at least two portions;
   a head for writing data to and reading data from the data fields in the fixed blocks, and for reading servo position information from the servo sectors;
   an actuator attached to the head for positioning the head across the tracks and for following specific tracks, the actuator being responsive to servo position information read by the head at an essentially constant servo sample rate determined by the rotational speed of the disk and the angular spacing of the servo sectors;
   means coupled to the head for clocking write data to and read data from the data fields at an essentially constant data rate for all tracks;
   means coupled to the head and responsive to a clock signal from the data clocking means for encoding data to and decoding data from the head; and
   means coupled to the encoding and decoding means for stopping the transfer of data to and from the encoding and decoding means when the head is reading servo position information from the servo sectors located within the data fields.

2. The disk drive according to claim 1 wherein the data stopping means comprises means for interrupting the essentially constant data rate clock signal to the encoding and decoding means.

3. The disk drive according to claim 1 further comprising:
   means for storing values representing the locations for servo sectors located within the data fields;
   a counter coupled to the data clocking means for counting the number of clock cycles;
   means coupled to the counter and the servo sector location value storing means for comparing the count value with a stored servo sector location value; and
   wherein the means for stopping the data transfer is responsive to the comparing means.

4. The disk drive according to claim 3 wherein the servo sector location value storing means comprises a register located off the disk.

5. A banded recording, fixed block architecture disk drive comprising:
   a rotatable, rigid magnetic recording disk having a plurality of radially spaced bands containing the fixed blocks for the recording of magnetically written data, and a plurality of generally equally angularly spaced servo sectors containing servo position information, each servo sector extending in a generally radially straight line across the bands;
   a head for writing data to and reading data from data fields located in the fixed blocks of each of the bands, and for reading servo position information from the servo sectors;
   means coupled to the head for clocking write data to and read data from the data fields at a plurality of data rates, each data rate having a unique value corresponding to the band in which the head is located; and
   an actuator attached to the head for positioning the head across the bands and within each of the bands, the actuator being responsive to servo position information read by the head at a constant servo sample rate regardless of the band in which the head is located or the corresponding rate at which the data is clocked, said constant servo sample rate being determined by the rotational speed of the disk and the angular spacing of the servo sectors.

6. The disk drive according to claim 5 wherein the disk has a radial index mark common to all the bands and extending across the bands in a generally radially straight line, and wherein the first servo sector is located at the common radial index mark.

7. The disk drive according to claim 5 wherein the servo sectors on the disk are located within the data fields of at least one of the bands.

8. The disk drive according to claim 7 wherein the servo sectors located within the data fields of at least one of the bands split each of the data fields into at least two portions of substantially different circumferential lengths.

9. The disk drive according to claim 5 wherein the number of data fields in a band varies from band to band, and wherein if the number of data fields within each band is represented by the variable M and the number of servo sectors on the disk is represented by the constant N, then the ratio of M to N for each band is equal to a ratio of two integers, each integer being between 1 and 12.

10. The disk drive according to claim 5 wherein at least one of the servo sectors in at least one of the bands is located within an identification field associated with one of the fixed blocks.

11. The disk drive according to claim 5 further comprising means coupled to the head for interrupting the reading and writing of data by the head when the servo position information from the servo sectors located within the data fields is being read by the head.

12. The disk drive according to claim 5 further comprising:

means for storing values representing the servo sector locations;

a counter coupled to the data clocking means for counting the number of clock cycles; and means coupled to the counter and the servo sector location value storing means for interrupting the reading and writing of data by the head when the counter reaches a value corresponding to a stored location value, whereby servo position information may be read by the head during the period of the interruption.

13. The disk drive according to claim 12 further comprising means coupled to the head and responsive to a clock signal from the data clocking means for encoding and decoding data, and wherein the interrupting means includes means for interrupting the clock signal to the encoding and decoding means, whereby the state of the encoding and decoding means is frozen during the period the servo position information is read by the head.

14. The disk drive according to claim 12 wherein the servo sector location value storing means comprises a register located off the disk.

* * * * *

(12) EX PARTE REEXAMINATION CERTIFICATE (6824th)
United States Patent
Hetzler

(10) Number: US 5,210,660 C1
(45) Certificate Issued: May 19, 2009

(54) STORED SERVO INDEPENDENT OF DATA ARCHITECTURE

(75) Inventor: Steven R. Hetzler, Sunnyvale, CA (US)

(73) Assignee: Hitachi Global Storage Technologies Netherlands B.V., Amsterdam (NL)

Reexamination Request:
No. 90/008,540, Jun. 4, 2007

Reexamination Certificate for:
Patent No.: 5,210,660
Issued: May 11, 1993
Appl. No.: 07/466,194
Filed: Jan. 17, 1990

(51) Int. Cl.
*G11B 5/012* (2006.01)

(52) U.S. Cl. .................. 360/51; 360/48; 360/77.08; 369/47.28; 369/47.54

(58) Field of Classification Search .................. None
See application file for complete search history.

(56) References Cited

U.S. PATENT DOCUMENTS

| 4,188,646 A | 2/1980 | Sordello |
| 4,714,967 A | 12/1987 | Bizjak |
| 5,121,280 A | 6/1992 | King |
| 5,157,670 A | 10/1992 | Kowal |

OTHER PUBLICATIONS

Cirrus Logic, "Preliminary Datasheet for CL–SH350 Microcontroller," Cirrus Logic Corporation, Nov. 1989.

*Primary Examiner*—Minh T Nguyen

(57) ABSTRACT

A data recording apparatus, such as a disk drive or tape drive is described wherein servo sectors written on a disk (or servo sections written on a tape) are equally spaced on a given track and read during seek, settle and track following operations. An algorithm is used to determine the allowable time separation between servo sectors (or sections) on a track and lengths of associated data sections, such as data sectors or variable length records, that may be accommodated on the disk or tape in such manner that each of the servo sectors (or sections) equally spaced on a given track is located within a data field of a data sector or within an identification region or immediately after an address indicating mark (such as address mark or index mark). The rate at which the servo sector (or section) is sampled is constant and independent of the number and lengths of the data sections. As a result of this independent relationship, this technique is suitable for CLD recording, to banded disks using sectored servo as in conventional FBA, and also even to non-sectored architectures, such as count-key-data (CKD), wherein the data is written in records of variable length, and to tape drives formatted in FBA or CKD.

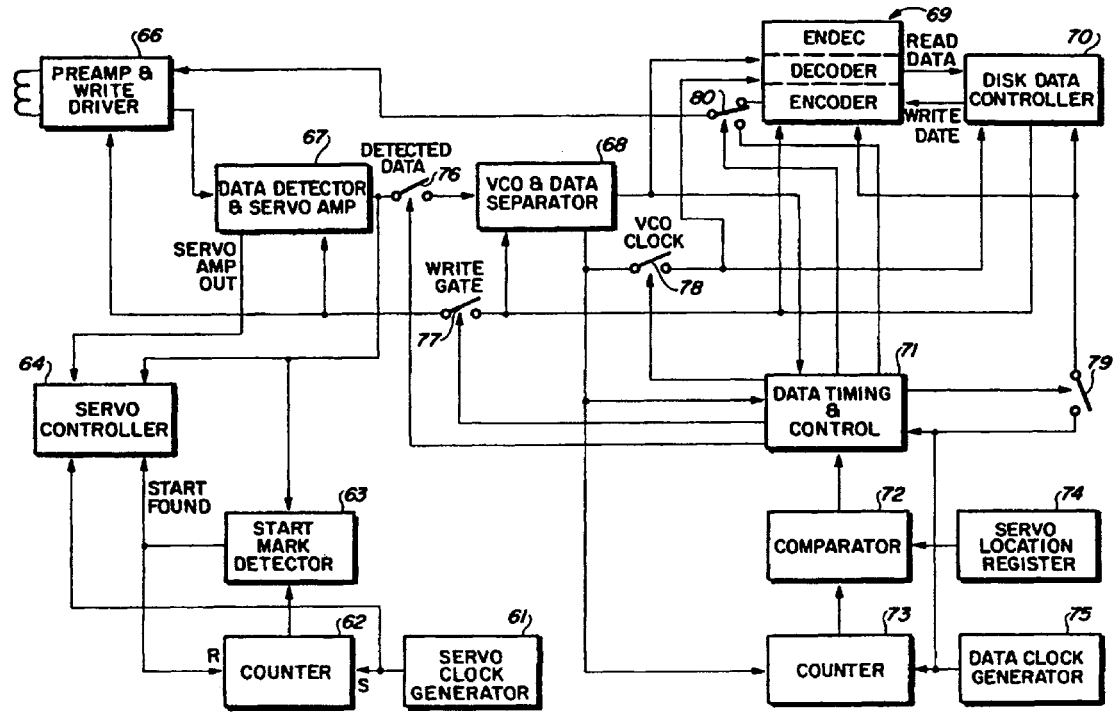

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9, 11–14 is confirmed.

Claim 10 was not reexamined.

\* \* \* \* \*